Nov. 4, 1952

F. A. DAHLIN 2,616,354

VENTILATOR

Filed March 17, 1950

INVENTOR
FRED A. DAHLIN,

BY
McMorrow, Berman + Davidson
ATTORNEYS

Nov. 4, 1952     F. A. DAHLIN     2,616,354
VENTILATOR
Filed March 17, 1950     2 SHEETS—SHEET 2
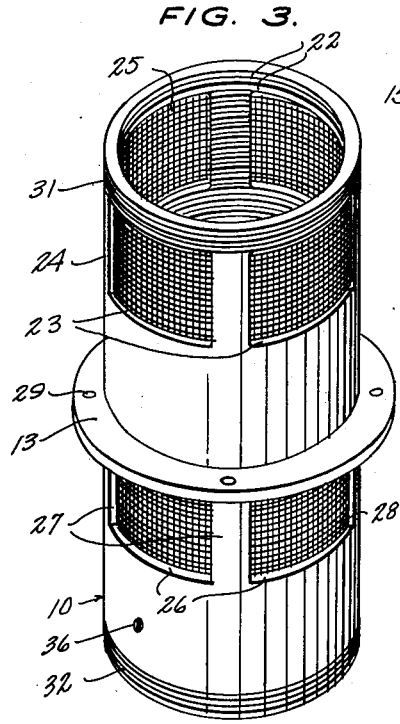
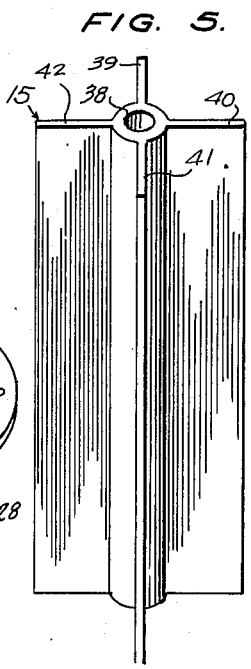
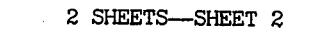
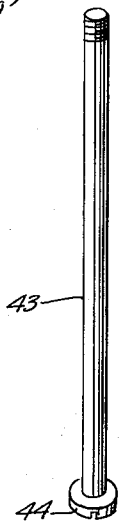
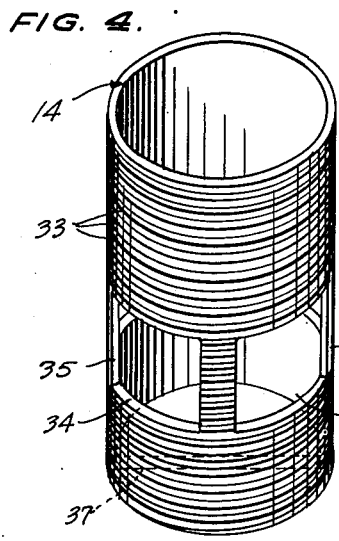
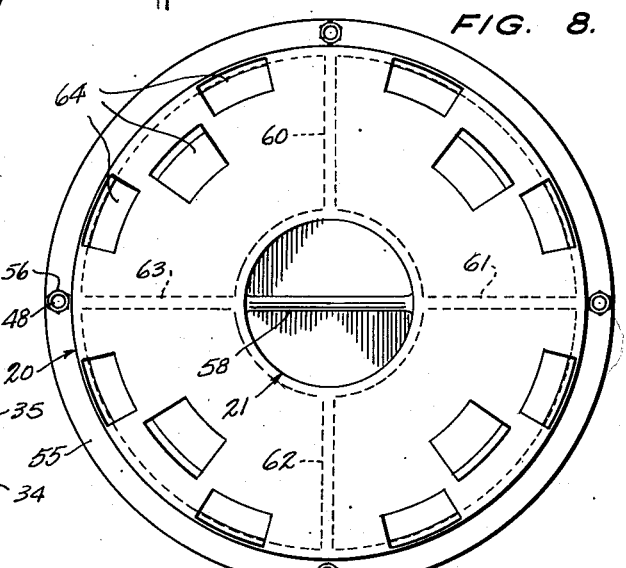
INVENTOR
FRED A. DAHLIN,
BY
McMorrow, Berman & Davidson
ATTORNEYS.

Patented Nov. 4, 1952

2,616,354

UNITED STATES PATENT OFFICE 2,616,354

VENTILATOR

Fred A. Dahlin, Chicago, Ill.

Application March 17, 1950, Serial No. 150,256

7 Claims. (Cl. 98—8)

This invention relates to ventilators and more particularly to a roof supported ventilator for a vehicle, such as an automobile, trailer or boat, or for a flat roofed house or similar structure, and constitutes an improvement on the ventilator disclosed in my Patent No. 2,489,011, issued November 22, 1949.

While the ventilator of my prior patent has been found to be fully effective for introducing fresh air into a space below a roof on which the ventilator is mounted and for regulating the quantity of air admitted to the space and screening or filtering the air to remove airborne material or objects, such as plant fragments, sand and insects, it has since been discovered that a simplified ventilator of this general character can be utilized to exhaust air from the space as well as to introduce air into the space and to cause the fresh air to circulate entirely through the space before such air is exhausted as used air through the ventilator, this admission, circulation and exhaust of the air being accomplished entirely by the relative wind to which the ventilator is subjected and without the use of any mechanical power or movement.

It is, therefore, among the objects of the present invention to provide an improved ventilator which can be mounted on a flat roof area with no modification to the roof structure other than providing a ventilator opening therethrough, which will receive air from above the roof and direct such air into a space below the roof and will simultaneously receive air from the space below the roof and exhaust such air above the roof, creating a circulation of air in the space below the roof while the air is being admitted and exhausted, which screens or filters the air passing therethrough, which is easily adjustable to regulate the quantity of ventilating air passed through the space, which is silent and efficient in operation, and which is simple and durable in construction, economical to manufacture, and neat and attractive in appearance.

Other objects and advantages will become apparent from a consideration of the following description and the appended claims in conjunction with the accompanying drawings wherein:

Figure 3 is a perspective view of a housing constituting a component of the ventilator assembly;

Figure 4 is a perspective view of a sleeve which is receivable in the housing illustrated in Figure 3 and constitutes another component of the ventilator assembly;

Figure 5 is a perspective view of a vane structure receivable in the sleeve illustrated in Figure 4 and constituting still another component of the ventilator assembly;

Figure 6 is a perspective view of a plate for covering one end of the vane structure illustrated in Figure 5;

Figure 7 is a perspective view of a bolt for securing the vane structure in operative position in the assembly; and Figure 8 is a bottom plan view of the ventilator assembly.

Figure 1:
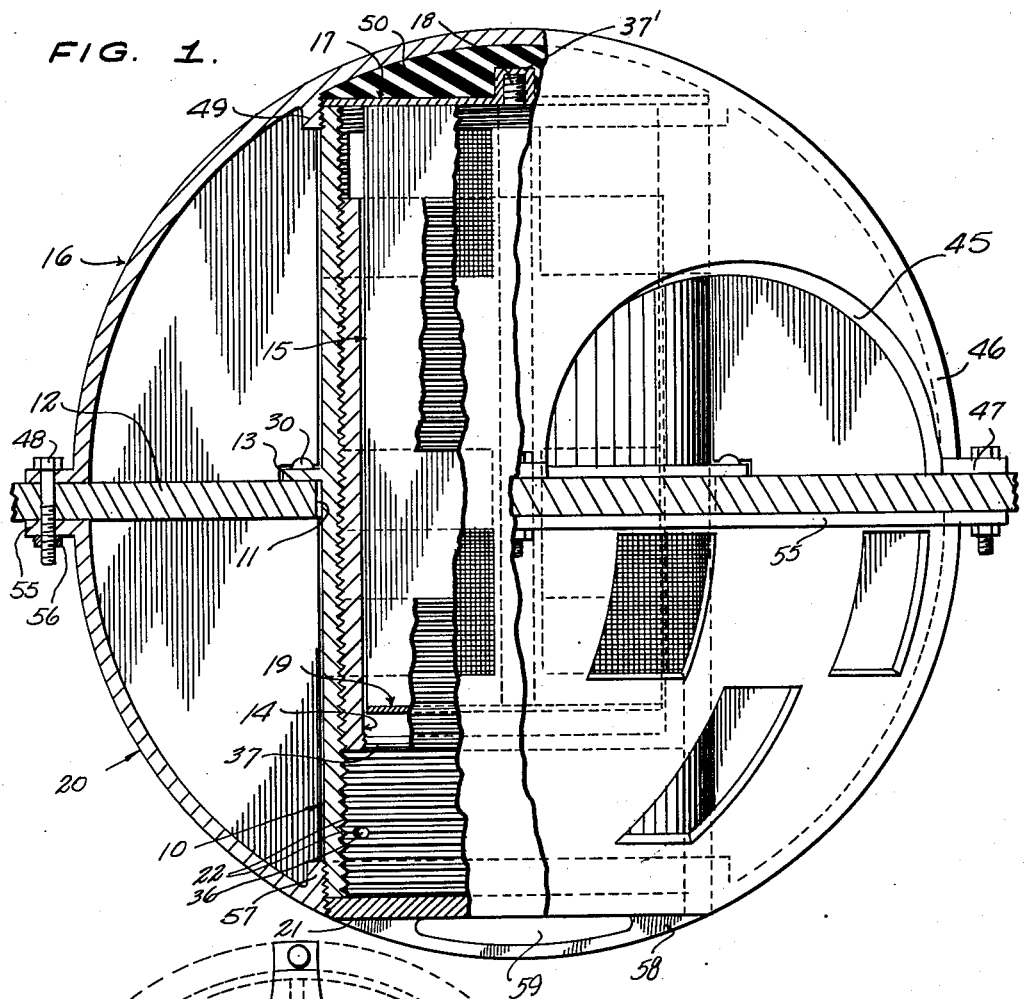
Figure 1 is a side elevational view of a ventilator assembly illustrative of the invention, portions being broken away and shown in cross section to better illustrate the construction thereof.
Figure 2:
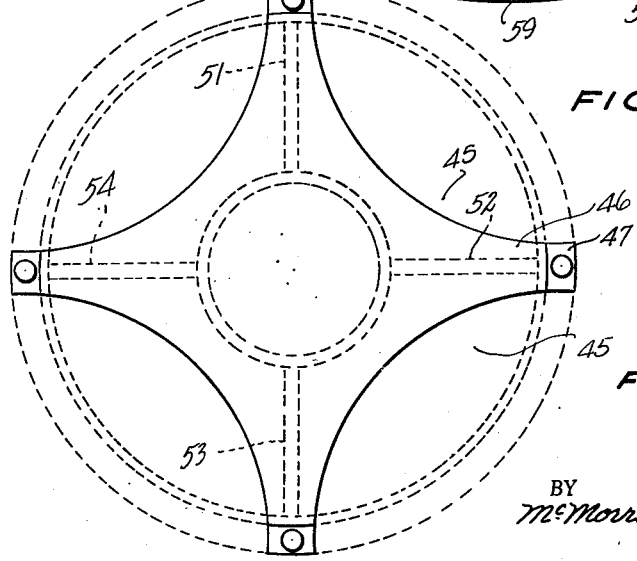
Figure 2 is a top plan view on a reduced scale of the ventilator assembly illustrated in Figure 1.

With continued reference to the drawings the ventilator assembly of the present invention comprises, in general, an elongated cylindrical housing 10 which is operatively positioned in an opening 11 in a roof 12 and provided intermediate its length with an apertured, roof engaging flange 13 which supports the housing in operative position relative to the roof, a sleeve 14 disposed within the housing 10, a vane structure 15 disposed within the sleeve, a hemispherical or dome shaped hollow cover 16 enclosing the housing 10 at the upper side of the roof and attached to the housing so that the cover and housing are substantially coaxial with each other, a plate 17 covering the upper end of the housing 10, a bolt 18 securing the vane structure 15 to the plate 17, a plate 19 covering the lower end of the vane structure, a hollow hemispherical or dome shaped cover 20 enclosing the portion of the housing 10 below the roof 12 and a cap 21 threaded into an aperture in the cover 20 and closing the lower end of the housing 10.

The housing 10, as particularly illustrated in Figure 3, is an elongated cylindrical body of thin walled construction and provided with internal screw threads 22 extending from one end substantially to the other end thereof. A set of four rectangular air passage openings 23 are provided in the housing near one end thereof which openings are of substantially the same length circumferentially of the housing and are separated at their adjoining ends by narrow portions 24 of the housing wall, the over center angular distance between each two adjacent portions 24 being approximately 90 degrees. Suitable screens 25, formed of wire mesh or other suitable material are secured in the openings 23 and each of these screens covers the entire area of the corresponding opening.

A second set of rectangular air passage openings 26 is provided in the housing wall intermediate the length of the housing and these openings are substantially the same length circumferentially of the housing and are separated at their adjacent ends by narrow portions 27 of the housing wall, these portions 27 having their center lines angularly spaced apart approximately 90 degrees around the housing. Screens 28 are secured in the openings 26 and each screen 28 covers the entire area of the corresponding opening.

The roof engaging formation 13 is an annular flange which surrounds the housing 10 substantially at the mid-length location of the housing and is disposed substantially perpendicular to the longitudinal center line of the housing. This flange is provided with angularly spaced apart apertures 29 which receive fasteners, such as the screws 30, for securing the housing to the roof structure 12. The sides of the openings 26 adjacent the flange 13 are spaced from the adjacent side of the flange a distance slightly greater than the thickness of the roof structure so that the openings 26 will be disposed entirely within the space below the roof while the openings 23 will be disposed entirely above the roof.

When the housing is operatively disposed in a roof structure the openings 23 are near the upper end of the housing and the openings 26 are immediately below the roof structure. The housing is provided with external screw threads 31 and 32 at its upper and lower ends respectively, the purpose of which external screw threads will be presently explained.

The sleeve 14 is an elongated cylindrical body of thin walled construction provided with external screw threads 33 which extend from one to the other end of the body, and provided intermediate its length with rectangular air passage openings 34 which are of the same size and shape as the openings 26 in the housing, adjacent openings 34 being separated by narrow portions 35 of the sleeve wall with the center lines of adjacent portions 35 angularly spaced apart at approximately 90 degree angles.

The sleeve 14 is threaded into the housing 10 and the sleeve 14 has a length such that when the openings 34 in the sleeve are in full registry with the openings 26 in the housing the upper end of the sleeve is adjacent the lower edges of the openings 23 in the housing.

By threading the sleeve 14 upwardly in the housing 10 until the upper end of the sleeve is flush with the upper end of the housing, all of the air passage openings will be blocked off and the ventilator will be closed. By threading the sleeve downwardly in the housing from the upper limiting position of the sleeve the openings can be variably opened and the ventilator will be completely opened when the upper end of the sleeve is at the bottom edges of the openings 23 and the openings 34 in the sleeve are in full registry with the openings 26 in the housing. Stop means for this fully open position may be provided by inserting a screw 36 through the housing to engage the lower end of the sleeve 14 when the sleeve is in the position relative to the housing corresponding to the fully opened condition of the ventilator.

A strut bar 37 extends diametrically across the sleeve 14 at the lower end of the sleeve to provide a handle by means of which the sleeve can be manually rotated to thread the sleeve along the housing.

The closure 17 for the upper end of the housing 10 comprises a flat metal plate or disc of circular shape having at its center an internally screw threaded boss 37'.

The vane structure 15 has a length slightly less than the length of the sleeve 14 and comprises a tubular center portion 38 and four flat vanes 39, 40, 41 and 42 which extend longitudinally of the tubular center portion 38 and project radially therefrom at angular intervals of 90 degrees. The vanes 39 and 41 are substantially in alignment with each other or, in other words, lie substantially in a common plane which includes the longitudinal axis of the tubular center portion 38 and the vanes 40 and 42 lie substantially in a common plane which includes the longitudinal center line of the tubular formation 38 and is perpendicular to the plane of the vanes 39 and 41. The distance between the outer edges of the vanes 39 and 41 and of the vanes 42 and 40 is substantially equal to the internal diameter of the sleeve 14 so that the vane structure 15 closely fits the interior of the sleeve.

A bolt 43, particularly illustrated in Figure 7, extends through the tubular center portion or formation 38 of the vane structure and is threaded at one end into the boss 37' of the cover plate 17 to mount the vane structure 15 at its upper end on the upper end of the housing 10. The bolt 43 has a head 44 on its opposite or lower end and the disc or plate 19 is interposed between this head and the bottom end of the vane structure and closes the sleeve 14 at the lower end of the vane structure so that air entering the sleeve through the upper openings 23 will be forced out of the sleeve through the sleeve openings 34 and the openings 26 in the housing when the ventilator is opened.

After the assembly including the housing, the sleeve, the vane structure and the plates 17 and 19 and bolt 43 has been assembled and mounted on the roof structure the outer cover 16 may be applied.

The outer cover 16 is dome shaped or semi-spherical in form and of thin walled construction. Four substantially semicircular openings are provided in this cover which openings are in the form of notches opening to the edge of the cover at the open end of the hemispherical cover. These openings, as indicated at 45, have an extent along the open end of the cover somewhat less than one fourth of the circumference of the cover at its open end and adjacent openings 45 are separated by narrow cover portions 46 each of which is provided at its end with an outwardly extending, apertured foot or flange 47. The flanges 47 rest on the top of the roof structure 12 with the holes therein substantially centered on a circle which is centered on the common axis of the housing 10 and sleeve 14 and the cover is secured to the roof structure by suitable fasteners such as the bolts 48 which extend through the apertures in the flanges or feet 47 respectively and through registering apertures in the roof structure.

The cover is provided with an internal annular boss or bead 49 which concentrically surrounds the center of the cover and is provided with internal screw threads which are threaded onto the screw threads 31 on the upper end of the housing 10. The boss 49 surrounds the periphery of the plate 17 and a filler 50 of suitable material, such as rubber, is disposed in the space between the plate 17 and the portion of the cover 16 within the boss 49.

Four vanes or baffles 51, 52, 53 and 54 are disposed within the cover 16 at angular intervals of approximately 90 degrees around the cover. These baffles are disposed substantially in planes which include the common axis of the housing 10, the sleeve 14 and the cover 16 and are joined at their outer edges to the cover portions 46 between adjacent openings 45. The vanes or baffles extend inwardly from the portions 46 substantially into contact with the outer surface of the portion of the housing 10 above the roof structure, being notched to receive the mounting flange 13 and the housing is located in the cover so that the inner edge of each of the vanes 51, 52, 53 and 54 is located between two adjacent openings 23 in the housing.

With the above described construction and with the sleeve 14 positioned in the housing 10 to open the ventilator, a relative wind blowing on one side of the cover 16 will pass through the air passage openings 45 at that side of the cover and will be guided by the adjacent vanes in the cover and the included portion of the roof into the corresponding openings 23 in the housing 10. The air will pass through the housing openings 23 at the windward side of the ventilator and downwardly through the spaces between the vanes of the vane structure with which these openings communicate and will flow from these spaces outwardly through the communicating openings 26 in the housing into the space below the roof structure. At the same time, the openings 45 at the leeward side of the cover 16 will be subjected to a slight suction which will draw air from the space below the roof structure through the corresponding openings 26 in the housing and through the spaces between the vanes of the vane structure 15 with which these last mentioned housing openings communicate and from such spaces through the housing openings 23 at the leeward side of the ventilator and from thence through the leeward openings 45 in the cover 16 passing between the corresponding cover vanes. As the fresh air entering the space through the ventilator will be directed in one direction away from the ventilator, and as the air exhausted from the space will be drawn into the opposite side of the ventilator, the fresh air will have to circulate entirely through the ventilated space before being withdrawn from the space by the ventilator.

The inner cover 20 is a hollow dome shaped or hemispherical body having an open end surrounded by an outwardly projecting flange 55 which is apertured to receive the bolts 48. The two cover members at the opposite sides of the roof structure 12 are clamped together by nuts 56 threaded onto the bolts 48 below the flange 55.

An annular bead or boss 57 is provided in the lower cover 20 substantially concentric with the center of the lower cover and this boss is provided with internal screw threads which receive the external screw threads 32 at the lower end of the housing 10. The portion of the lower housing within the boss 57 is cut away and this opening is closed by the cover plate or plug 21 which is screw threaded into the outer portion of the boss 57 and bears against the lower end of the housing 10. A rib 58 extends diametrically across the outer side of the plate of the closure plug 21 and this rib is provided with an opening 59 so that the rib constitutes a convenient handle for threading the closure plug into and out of the lower cover. The closure plug 21 has to be removed before the sleeve 14 can be adjusted in the housing 10 to regulate the quantity of air admitted by the ventilator.

Four vanes 60, 61, 62 and 63 are provided in the lower cover 20 and are disposed substantially in planes which include the common axis of the housing 10, the sleeve 14 and the two covers. These vanes are joined at their outer edges to the inner surface of the lower cover and are positioned at angular intervals of approximately 90 degrees and the lower cover is positioned relative to the housing so that each of the vanes 60, 61, 62 and 63 is disposed at its inner edge between two adjacent openings 26 in the housing.

The lower cover is provided between each two adjacent vanes with a plurality of rectangular air passage openings 64 through which air leaves or enters the lower housing in the ventilating operation of the device. These openings are each materially smaller than the area of the portion of the cover between two adjacent vanes and are staggered relative to each other to diffuse the air currents passing through the lower cover so that the ventilator will not create noticeable drafts or blasts of air in the ventilated space.

The vanes in the lower cover help to direct the air leaving and entering the ventilator so that a complete circulation of the ventilating air through the ventilated space is obtained.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A ventilator assembly mountable on a flat roof area comprising an elongated hollow housing disposable in a roof opening and having roof engaging means intermediate the length thereof, said housing having two sets of angularly spaced apart air passage openings therein disposed one set at each side of said roof engaging means, internal screw threads in said housing extending substantially from one to the other end thereof, a screen covering each air passage opening in said housing, an externally screw threaded sleeve threaded into said housing and having a set of angularly spaced apart air passage openings adjacent one end thereof, an end wall closing one end of said housing, an elongated vane structure disposed in said sleeve and having a plurality of angularly spaced apart vanes extending longitudinally of said sleeve and disposed one between each two adjacent air passage openings in said housing, means securing said end wall against one end of said vane structure to mount said vane structure in said housing, a plate covering the other end of said vane structure, a handle extending transversely of said sleeve at the end of said sleeve remote from said end wall for threading said sleeve along said housing to variably restrict the air passage openings in said housing, a dome shaped cover mountable on a roof structure and attached to said housing at said one end of the latter so that said cover and said housing are substantially coaxial with each other, said cover having angularly spaced apart air passage openings therein, and vanes in said cover disposed substantially in planes including the common axis of said housing and said cover and each extending from a position in said cover between two adjacent air passage openings in the latter to a position on said housing between two adjacent air passage openings in the housing.

2. A ventilator assembly comprising dome shaped covers mountable on a roof structure one above and one below said structure and opposed to each other at their open ends, each of said covers having spaced apart air passage openings therein, air guiding means in said covers for directing air from openings in one side of one of said covers through openings in the corresponding side of the other of said covers and air from openings in the opposite side of said other cover to openings in the opposite side of said one cover, and manually movable adjusting means in said air guiding means for regulating the quantity of air flowing through the ventilator assembly.

3. A ventilator assembly comprising dome shaped covers mountable on a roof structure one above and one below said structure and opposed to each other at their open ends, each of said covers having spaced apart air passage openings therein, air guiding means in said covers for directing air from openings in one side of one of said covers through openings in the corresponding side of the other of said covers and air from openings in the opposite side of said other cover to openings in the opposite side of said one cover, and manually movable adjusting means in said air guiding means for regulating the quantity of air flowing through the ventilator assembly, said air guiding means comprising an elongated housing secured at its opposite ends to said covers and adapted to extend through a roof structure on which said covers are mounted, said housing having two sets of angularly spaced apart air passage openings therein so disposed that the openings of one set communicate with the interior of said one cover and the openings of the other set communicate with the interior of said other cover, a vane structure in said housing providing passages in said housing connecting each air passage opening in one set of such openings in the housing with a corresponding opening in the other set of such openings, and vanes in each cover providing air passages in the covers connecting the air passage openings in said covers with corresponding air passage openings in said housing.

4. A ventilator assembly comprising dome shaped covers mountable on a roof structure one above and one below said structure and opposed to each other at their open ends, each of said covers having air passage openings therein, air guiding means in said covers for directing air from openings in one side of one of said covers through openings in the corresponding side of the other of said covers and air from openings in the opposite side of said other cover to openings in the opposite side of said one cover, and manually movable adjusting means in said air guiding means for regulating the quantity of air flowing through the ventilator assembly, said air guiding means comprising an elongated housing secured at its opposite ends to said covers and adapted to extend through a roof structure on which said covers are mounted, said housing having two sets of angularly spaced apart air passage openings in the side wall thereof, said sets of openings being spaced apart longitudinally of said housing so that the openings of one set communicate with the interior of said one cover and the openings of the other set communicate with the interior of said other cover, a vane structure in said housing providing passages in said housing connecting each air passage opening in one set of such openings in the housing with a corresponding opening in the other set of such openings, vanes in each cover providing air passages in the covers connecting the air passage openings in said covers with corresponding air passage openings in said housing, and means closing each end of said housing.

5. A ventilator assembly comprising dome shaped covers mountable on a roof structure one above and one below said structure and opposed to each other at their open ends, each of said covers having air passage openings therein, air guiding means in said covers for directing air from openings in one side of one of said covers through openings in the corresponding side of the other of said covers and air from openings in the opposite side of said other cover to openings in the opposite side of said one cover, and manually movable adjusting means in said air guiding means for regulating the quantity of air flowing through the ventilator assembly, said air guiding means comprising an elongated housing secured at its opposite ends to said covers and adapted to extend through a roof structure on which said covers are mounted, said housing having two sets of angularly spaced apart air passage openings in the side wall thereof, said sets of openings being spaced apart longitudinally of said housing so that the openings of one set communicate with the interior of said one cover and the openings of the other set communicate with the interior of said other cover, a vane structure in said housing providing passages in said housing connecting each air passage openings in one set of such openings in the housing with a corresponding opening in the other set of such openings, and vanes in each cover providing air passages in the covers connecting the air passage openings in said covers with corresponding air passage openings in said housing and said adjusting means comprising a sleeve disposed within said housing and manually movable longitudinally of the latter to variably restrict at least one set of air passage openings in said housing.

6. A ventilator assembly mountable on a flat support for directing air from one side to the other side of the support at one side of the assembly and from said other to said one side of the support at the other side of the assembly comprising a dome shaped cover having an open end and angularly spaced apart air passage openings therein adjacent said open end, an elongated housing secured at one end to said cover and projecting beyond the open end of the latter for reception in an opening in the support on which said cover is mounted, a flange on said housing for attaching the latter to the support, said housing having therein two sets of angularly spaced apart air passage openings disposed one set at one side and the other at the other side of said flange, vanes in said cover providing in association with the support air passages connecting the openings in said cover with corresponding openings of one set of openings in said housing, a vane structure in said housing extending past both sets of openings therein and providing air passages connecting each opening of one set with a corresponding opening of the other set of openings in said housing, means closing said housing at the opposite ends of said vane structure, a sleeve in said housing surrounding said vane structure and adjustably movable longitudinally of said housing to variably restrict at least one set of air passage openings in said housing, a second dome shaped cover secured to the other end of said housing and having an open end and air passage openings therein, means on said second cover at the open end thereof for attaching said second cover to the support at the side of the latter opposite the first mentioned cover, and vanes in said second cover providing in association with the support air passages connecting the air passage openings in said second cover with the corresponding air passage openings of the other set of such openings in said housing.

7. A ventilator assembly mountable on a flat support for directing air from one side to the other side of the support at one side of the assembly and from said other to said one side of the support at the other side of the assembly comprising a dome shaped cover having an open end and angularly spaced apart air passage openings therein adjacent said open end, an elongated housing secured at one end to said cover and projecting beyond the open end of the latter for reception in an opening in the support on which said cover is mounted, a flange on said housing for attaching the latter to the support, said housing having therein two sets of angularly spaced apart air passage openings disposed one set at one side and the other at the other side of said flange, vanes in said cover providing in association with the support air passages connecting the openings in said cover with corresponding openings of one set of openings in said housing, a vane structure in said housing extending past both sets of openings therein and providing air passages connecting each opening of one set with a corresponding opening of the other set of openings in said housing, means closing said housing at the opposite ends of said vane structure, a sleeve in said housing surrounding said vane structure and adjustably movable longitudinally of said housing to variably restrict at least one set of air passage openings in said housing, a second dome shaped cover secured to the other end of said housing and having an open end and air passage openings therein, means on said second cover at the open end thereof for attaching said second cover to the support at the side of the latter opposite the first mentioned cover, and vanes in said second cover providing in association with the support air passages connecting the air passage openings in said second cover with the corresponding air passage openings of the other set of such openings in said housing, the air passage openings in said second cover being smaller in size and greater in number than the air passage openings in said first mentioned cover.

FRED A. DAHLIN.

REFERENCES CITED

The following references are of record in the file of this patent:

UNITED STATES PATENTS

| Number | Name | Date |
|---|---|---|
| 45,814 | Burnett | Jan. 10, 1865 |
| 1,245,851 | Wright | Nov. 6, 1917 |
| 1,289,821 | Laakso | Dec. 31, 1918 |
| 1,836,438 | Bombard et al. | Dec. 15, 1931 |
| 2,489,011 | Dahlin | Nov. 22, 1949 |

FOREIGN PATENTS

| Number | Country | Date |
|---|---|---|
| 610,763 | France | June 19, 1926 |